(12) United States Patent
Rathineswaran et al.

(10) Patent No.: US 10,572,220 B2
(45) Date of Patent: Feb. 25, 2020

(54) METHOD FOR CONTROLLING CONTROLLER AND HOST COMPUTER WITH VOICE

(71) Applicant: American Megatrends International, LLC, Norcross, GA (US)

(72) Inventors: Chandrasekar Rathineswaran, Duluth, GA (US); Viswanathan Swaminathan, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 15/485,429

(22) Filed: Apr. 12, 2017

(65) Prior Publication Data
US 2018/0301146 A1    Oct. 18, 2018

(51) Int. Cl.
*G06F 13/16*    (2006.01)
*G06F 3/16*    (2006.01)

(52) U.S. Cl.
CPC .................................. *G06F 3/167* (2013.01)

(58) Field of Classification Search
None
See application file for complete search history.

(56) References Cited

U.S. PATENT DOCUMENTS

| | | | |
|---|---|---|---|
| 6,185,535 B1 * | 2/2001 | Hedin | G10L 15/30 704/270 |
| 7,272,134 B2 * | 9/2007 | Iwama | H04M 7/1285 370/352 |
| 8,136,042 B2 * | 3/2012 | Holovacs | G06F 3/023 370/392 |
| 8,412,532 B2 * | 4/2013 | Gruenstein | G10L 15/32 340/4.4 |
| 9,632,806 B1 * | 4/2017 | Righi | G06F 9/44505 |
| 9,794,613 B2 * | 10/2017 | Jang | G10L 15/22 |
| 9,953,645 B2 * | 4/2018 | Bak | G10L 15/22 |
| 9,966,070 B2 * | 5/2018 | Koetz | G10L 15/22 |
| 2006/0165092 A1 * | 7/2006 | Wilson | H04M 3/42263 370/395.21 |
| 2010/0306424 A1 * | 12/2010 | Akester | G06F 3/023 710/36 |
| 2013/0013300 A1 * | 1/2013 | Otani | G10L 21/038 704/205 |

(Continued)

*Primary Examiner* — Neeraj Sharma
(74) *Attorney, Agent, or Firm* — Locke Lord LLP; Tim Tingkang Xia, Esq.

(57) ABSTRACT

Systems and methods to control a controller, such as a baseboard management controller (BMC), and its host computer with voice. The system may include a mobile device, which is communicatively connected to the controller via a network. The mobile device may receive a voice input, and generate a corresponding instruction by performing voice recognition to the voice input. The instruction may be sent to the controller for controlling the controller or its host computer. For example, the controller may perform a corresponding operation based on the instruction to determine whether the instruction is for the controller or for the host computer. When the instruction is for the host computer, in response to determining the target as the host computing device, the controller may perform keyboard-video-mouse (KVM) redirection to redirect the instruction to the host computer.

18 Claims, 3 Drawing Sheets

(56) References Cited

U.S. PATENT DOCUMENTS

| | | | |
|---|---|---|---|
| 2014/0282045 A1* | 9/2014 | Ayanam | G06F 3/0484 715/740 |
| 2016/0147691 A1* | 5/2016 | Huang | G06F 3/0227 710/65 |
| 2017/0046115 A1* | 2/2017 | Rahardjo | G06F 3/162 |
| 2018/0020007 A1* | 1/2018 | Jesurajan Marystella | G06F 9/4416 |

* cited by examiner

METHOD FOR CONTROLLING CONTROLLER AND HOST COMPUTER WITH VOICE

FIELD

The present disclosure relates generally to controller technology, and more particularly to systems and methods for controlling a controller, such as a baseboard management controller (BMC), and its host computer with voice.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Voice control is a rapid developing computer technology, allowing a user to input commands to a computer by voice. Typically, the computer may utilize voice recognition technology to enable voice control. In this case, a user may input the command by saying the command or making a voice to trigger the command, and the computer may perform voice recognition to the voice to generate the corresponding command. In this case, however, the user must be present at the computer such that the voice of the user may be captured by the computer.

Therefore, an unaddressed need exists in the art to address the aforementioned deficiencies and inadequacies.

SUMMARY

Certain aspects of the disclosure direct to a method for controlling a controller with voice, which includes: receiving, by a mobile device communicatively connected to the controller via a network, a voice input; generating, by the mobile device, an instruction for the controller or a computing device communicatively connected to the controller based on the voice input; sending, by the mobile device, the instruction to the controller via the network; and performing, by the controller, a corresponding operation based on the instruction.

In certain embodiments, the controller is a baseboard management controller (BMC).

In certain embodiments, the instruction is a controller instruction for the controller, and the corresponding operation includes: determining the instruction as the controller instruction; and in response to determining the instruction as the controller instruction for the controller, performing a controller operation as the corresponding operation based on the controller instruction.

In certain embodiments, the computing device is a host computing device of the controller that enables out-of-band (OOB) voice control by the voice input at the mobile device. In certain embodiments, the instruction is a host instruction for the host computing device, and the corresponding operation includes: determining the instruction as the host instruction; and in response to determining the target as the host computing device, performing, as the corresponding operation, keyboard-video-mouse (KVM) redirection to redirect the host instruction to the host computing device.

In certain embodiments, the host instruction comprises a hotkey input signal or a mouse input signal.

In certain embodiments, the mobile device is configured to generate the instruction based on the voice input by: performing voice recognition to the voice input to obtain a recognition result; and generating the instruction based on the recognition result.

In certain embodiments, the recognition result comprises a text message recognized from the voice input, and the instruction is generated based on the text message.

In certain embodiments, the mobile device is configured to perform voice recognition to the voice input by: generating, by a voice receiving device, a voice signal based on the voice input; and comparing the voice signal with predefined voice pattern data to obtain the recognition result. In certain embodiments, the voice receiving device is a microphone.

Certain aspects of the disclosure direct to a controller, which includes a processor and a memory storing computer executable code. The computer executable code, when executed at the processor, is configured to: receive an instruction from a mobile device communicatively connected to the controller via a network; and perform, based on the instruction, a corresponding operation to control the controller or a computing device communicatively connected to the controller. The instruction is generated by the mobile device by: receiving a voice input; and performing voice recognition to the voice input to generate the instruction.

Certain aspects of the disclosure direct to a mobile device capable of controlling a controller and a computing device. The mobile device includes a voice receiving device configured to receive a voice input; a processor; and a memory storing computer executable code. The computer executable code, when executed at the processor, is configured to: perform voice recognition to the voice input received by the voice receiving device to generate an instruction for the controller or the computing device; and send the instruction to the controller via a network, wherein the controller is configured to perform a corresponding operation based on the instruction.

In certain embodiments, the computer executable code is configured to performing voice recognition to the voice input to obtain a recognition result, and the instruction is generated based on the recognition result.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
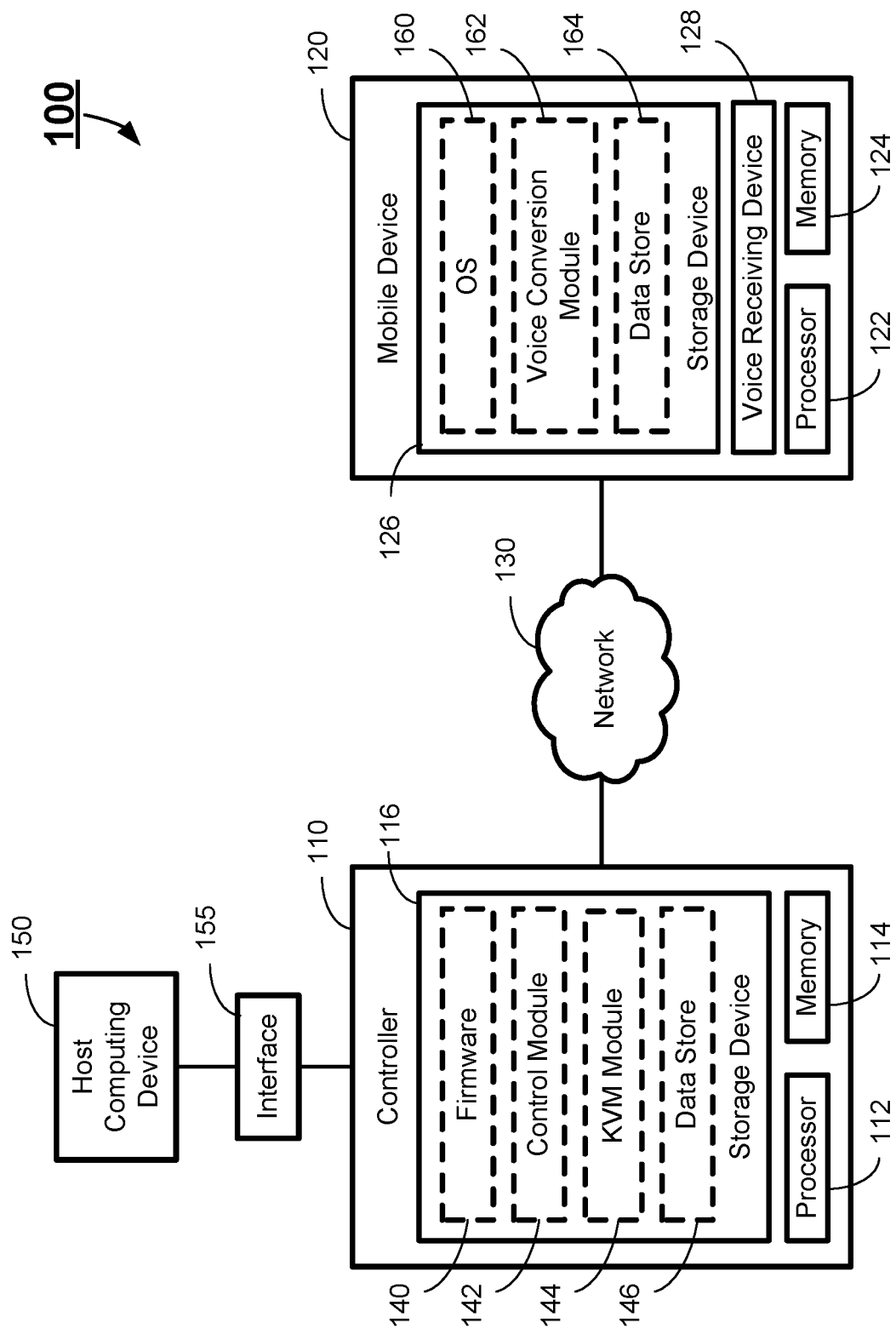
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for controlling a controller, such as a BMC, and its host computer with voice. In particular, external interfaces for the BMC and other management controllers are now available for many modern devices. Based on the form factor, the devices may vary from wearable small devices to mountable large devices. Thus, such modern devices may be used to control the BMC (or other controllers) through voice inputs where applicable. In certain embodiments, the host computing device being connected to the BMC (or other controllers) can also be controlled through the same voice inputs by keyboard-video-mouse (KVM) and media redirection features. Although the host computing device may employ its own voice input module, the voice control through the BMC may enable additional out-of-band voice control for the host computing device, which allows simultaneous user control of the host computing device.

FIG. 1 schematically depicts an exemplary system according to certain embodiments of the present disclosure. As shown in FIG. 1, the system 100 includes a controller 110, which is communicatively connected to a host computing device 150 via an interface 155. In addition, the system 100 further includes a mobile device 120, which is communicatively connected to the controller 110 via a network 130, such that a user may remotely access the controller 110 through the mobile device 120. For example, a user at the mobile device 120 may control the controller 110 as well as the host computing device 150 through the voice input feature provided at the mobile device 120. In certain embodiments, the network 130 may be a wired or wireless network, and may be of various forms. Examples of the network 130 may include, but is not limited to, a local area network (LAN), a wide area network (WAN) including the Internet, or any other type of networks.

The controller 110 is a specialized microcontroller configured to provide the service to the users. In certain embodiments, the controller 110 may be a BMC used for baseboard management purposes. Alternatively, the controller 110 may be a management controller for other purposes, such as chassis management, rack management, virtual machine management, backplane or enclosure management, or other type of purposes. In certain embodiments, examples of the controller 110 may include a microcontroller based controller, a complex programmable logic device (CPLD) based controller, a field-programmable gate array (FPGA) based controller, or any combination thereof.

As shown in FIG. 1, the controller 110 includes a processor 112, a memory 114, and a storage device 116. Further, the controller 110 may include other hardware components and software components (not shown) to perform its corresponding tasks. For example, the controller 110 may include a network interface, such as a network interface card (NIC), which is used to connect the controller 110 to the network 130. Other examples of these hardware and software components of the controller 110 may include, but not limited to, other required memory, interfaces, buses, Input/Output (I/O) modules and peripheral devices.

The processor 112 is the processing core of the controller 110, configured to control operation of the controller 110. In certain embodiments, the processor 112 may execute any computer executable code or instructions, such as the firmware 140, the control module 142 and the KVM module 144, or other applications and instructions of the controller 110. In certain embodiments, the controller 110 may run on more than one processor, such as two processors, four processors, eight processors, or any suitable number of processors.

The memory 114 can be a volatile memory, such as the random-access memory (RAM), for storing the data and information during the operation of the controller 110. In certain embodiments, the memory 114 may be a volatile memory array. In certain embodiments, the controller 110 may run on more than one memory 114.

The storage device 116 is a non-volatile data storage media for storing computer executable code or instructions for performing the operation of the controller 110. In certain embodiments, the computer executable code or instructions of the controller 110 may be implemented as one or more application programs or modules. Examples of the storage device 116 may include non-volatile memory such as flash memory, non-volatile random-access memory (NVRAM), memory cards, USB drives, hard drives, floppy disks, optical drives, or any other types of data storage devices. In certain embodiments, the controller 110 may have multiple storage devices 116, which may be identical storage devices or different types of storage devices, and the firmware 140, the control module 142, the KVM module 144, the data store 146, and other applications or data of the controller 110 may be stored in one or more of the storage devices 116 of the controller 110.

As shown in FIG. 1, the applications and data stored in the storage device 116 include the firmware 140, the control module 142, the KVM module 144, and the data store 146. As discussed above, each of the firmware 140, the control module 142, the KVM module 144, and the data store 146 may be formed by the computer executable code or instructions executable at the processor 112. In certain embodiments, each of the firmware 140, the control module 142, the KVM module 144, and the data store 146 may further include sub-modules. Alternatively, in certain embodiments, some or all of the firmware 140, the control module 142, the KVM module 144, and the data store 146 may be combined to form a single module. In certain embodiments, the storage device 116 may store other applications independent from the firmware 140, the control module 142, the KVM module 144, and the data store 146. For example, the storage device 116 may store software modules that provide a plurality of services, such as the web server service, the Intelligent Platform Management Interface (IPMI) service, the media redirection service, or any other types of services.

The firmware 140 stored in the storage device 116 includes the computer executable code that may be executed at the processor 112 to enable the operations of the controller 110. In certain embodiments, the firmware 140 may include one or more modules or software components that may be executed independently. In certain embodiments, the control module 142, the KVM module 144, and the data store 146 may be a part of the firmware 140. In certain embodiments, each of the control module 142, the KVM module 144, and the data store 146 may respectively be a separate software module independent from the firmware 140.

The control module 142 is a software application configured to receive an instruction from the mobile device 120 and perform a corresponding operation at the controller 110. Specifically, the instruction is generated at the mobile device 120 based on a voice input received at the mobile device 120. When the controller 110 receives such an instruction from the mobile device 120, the control module 142 may perform a corresponding operation based on the instruction.

In certain embodiments, when the controller 110 receives the instruction from the mobile device 120, the control module 142 may first determine the target of the instruction (i.e., the intended target being controlled by the voice input at the mobile device 120). For example, the instruction may be a controller instruction for the controller 110, or may be a host instruction for the host computing device 150. When the instruction is the controller instruction for the controller 110, the control module 142 may perform a controller operation as the corresponding operation based on the controller instruction. In certain embodiments, the controller instruction may involve an instruction related to the firmware 140 or a service provided by the controller 110. For example, the controller instruction may be an IPMI command, and the control module 142 may invoke the IPMI feature of the firmware 140 (or in certain embodiments, an IPMI module separated from the firmware 140) based on the IPMI command. In certain embodiments, the controller instruction may involve an instruction related to the KVM module 144. On the other hand, when the instruction is a host instruction for the host computing device 150, the control module 142 may perform a corresponding operation to trigger the KVM module 144 to perform KVM redirection to redirect the host instruction to the host computing device 150.

The KVM module 144 is a software application configured to provide a KVM redirection service. In certain embodiments, when executed, the KVM module 144 may establish a KVM session with a KVM client device (e.g., the host computing device 150, or any other remote computing device connected to the controller 110) so as to provide KVM redirections between the controller 110 and the KVM client device. In certain embodiments, the KVM redirection provided by the KVM module 144 may be used as means to forward the host instruction to the host computing device 150. For example, the host instruction may include a hotkey input signal or a mouse input signal for the host computing device 150. In this case, the KVM module 144 may perform KVM redirection such that the host instruction (i.e., the hotkey input signal or the mouse input signal) is redirected to the host computing device 150.

The data store 146 is a database for storing the data for the controller 110. In certain embodiments, the data stored in the data store 146 may include, without being limited to, the necessary information for the operation of the firmware 140, the control module 142 and/or the KVM module 144. For example, the data stored in the data store 146 may include information of the type of instructions (e.g., the host instruction or the controller instruction) being received from the mobile device 120.

The mobile device 120 is a computing device configured to receive the voice input from the user, to convert the voice input to the instruction, and to send the converted instruction to the controller 110. In certain embodiments, the mobile device 120 may be a wearable device that is convenient for a user to wear or carry around, such that the user may control the controller 110 regardless of the user's location. Examples of the mobile device 120 may include, without being limited thereto, a smartphone, a tablet device, a smartwatch, a laptop computer, or any other types of mobile device having computing features.

As shown in FIG. 1, the mobile device 120 includes a processor 122, a memory 124, a storage device 126, and a voice receiving device 128 for receiving the voice input from the user. In certain embodiments, the voice receiving device 128 may be a microphone, or any other voice receiving device or means that may be configured to receive the voice input from the user and generate a corresponding voice signal based on the voice input received. Further, the mobile device 120 may include other hardware components and software components (not shown) to perform its corresponding tasks. For example, the mobile device 120 may include a network interface, such as a network interface card (NIC), which is used to connect the mobile device 120 to the network 130. Other examples of these hardware and software components of the mobile device 120 may include, but not limited to, other required memory, interfaces, buses, Input/Output (I/O) modules and peripheral devices.

The processor 122 is the processing core of the mobile device 120, configured to control operation of the mobile device 120. In certain embodiments, the processor 122 may execute any computer executable code or instructions, such as the operating system (OS) 160, the voice conversion module 162, or other applications and instructions of the controller 110. In certain embodiments, the mobile device 120 may run on more than one processor, such as two processors, four processors, eight processors, or any suitable number of processors.

The memory 124 can be a volatile memory, such as the random-access memory (RAM), for storing the data and information during the operation of the mobile device 120. In certain embodiments, the memory 124 may be a volatile memory array. In certain embodiments, the mobile device 120 may run on more than one memory 124.

The storage device 126 is a non-volatile data storage media for storing computer executable code or instructions for performing the operation of the mobile device 120. In certain embodiments, the computer executable code or instructions of the mobile device 120 may be implemented as one or more application programs or modules. Examples of the storage device 116 may include non-volatile memory such as flash memory, non-volatile random-access memory (NVRAM), memory cards, USB drives, hard drives, floppy disks, optical drives, or any other types of data storage devices. In certain embodiments, the mobile device 120 may have multiple storage devices 126, which may be identical storage devices or different types of storage devices, and the OS 160, the voice conversion module 162, the data store 164, and other applications or data of the mobile device 120 may be stored in one or more of the storage devices 126 of the mobile device 120.

As shown in FIG. 1, the applications and data stored in the storage device 126 include the OS 140, the voice conversion module 162 and the data store 164. As discussed above, each of the OS 140, the voice conversion module 162 and the data store 164 may be formed by the computer executable code or instructions executable at the processor 122. In certain embodiments, each of the OS 140, the voice conversion module 162 and the data store 164 may further include sub-modules. Alternatively, in certain embodiments, some or all of the OS 140, the voice conversion module 162 and the data store 164 may be combined to form a single module. In certain embodiments, the storage device 126 may store other applications independent from the OS 140, the voice conversion module 162 and the data store 164. For example, the storage device 126 may store software modules that provide a plurality of services, such as a web client service, which may perform communication with the web server service provided at the controller 110.

The OS 160 is a managing software of the mobile device 120, which includes the computer executable code that may be executed at the processor 122 to enable the operations of the OS 140, the voice conversion module 162 and the data store 164. In certain embodiments, the OS 160 may include one or more modules or software components that may be executed independently. In certain embodiments, the voice conversion module 162 and the data store 164 may be a part of the OS 160. In certain embodiments, each of the voice conversion module 162 and the data store 164 may respectively be a separate software module independent from the OS 160.

The voice conversion module 162 is a software application configured to convert the voice signal generated by the voice receiving device 128 and generate the instruction based on the voice signal. In certain embodiments, the voice conversion module 162 may be a voice recognition software, which is configured to perform voice recognition to the voice signal to obtain a recognition result, such that the instruction may be generated based on the recognition result. For example, when the voice conversion module 162 receives the voice signal from the voice receiving device 128, the voice conversion module 162 may compare the voice signal with predefined voice pattern data stored in the data store 164, and obtain a recognition result. Then the voice conversion module 162 may generate the instruction based on the recognition result.

The data store 164 is a database for storing the data for the mobile device 120. In certain embodiments, the data stored in the data store 164 may include, without being limited to, the necessary information for the operation of the OS 160 and the voice conversion module 162. For example, the data stored in the data store 164 may include information of the predefined voice pattern data, which may be used by the voice conversion module 162 to perform voice recognition.

In certain embodiments, the recognition result being obtained by the voice conversion module 162 may include a text message recognized from the voice input that is intended for a controller instruction. For example, a user may say a word or a sentence as the voice input, such as a sentence of "server power on". In this case, when the voice conversion module 162 receives the voice signal from the voice receiving device 128, the voice conversion module 162 may perform voice recognition (more precisely, text recognition in this case) to the voice signal to obtain, as the recognition result, the text message "server power on" as the exact sentence said by the user. In certain embodiments, the user may say the sentence in different forms or factors that refer to the same instruction. For example, different sentences such as "power on the server" or "server power on" may refer to the same instruction to power on a server at the controller 110. In one embodiment, the voice conversion module 162 may generate the text message and use the text message as the instruction, and send the instruction (i.e., the exact text message) to the controller 110, and the control module 142 at the controller 110 may recognize the instruction and perform the corresponding operation. In another embodiment, the voice conversion module 162 may generate the text message, and then generate a corresponding instruction based on the text message. In this case, the instruction may or may not be in the text format.

In certain embodiments, the recognition result being obtained by the voice conversion module 162 may include a message recognized from the voice input that is intended for a host instruction, such as a hotkey input signal or a mouse input signal. For example, a user may say a word or a sentence as the voice input, such as the terms "host control D," which refers to a hotkey stroke of CTRL-D being sent to the host computing device 150. In this case, when the voice conversion module 162 receives the voice signal from the voice receiving device 128, the voice conversion module 162 may perform voice recognition (more precisely, text recognition in this case) to the voice signal to obtain, as the recognition result, the text message "host control D" as the exact sentence said by the user. In one embodiment, the voice conversion module 162 may generate the text message and use the text message as the instruction, and send the instruction (i.e., the exact text message) to the controller 110, and the control module 142 at the controller 110 may recognize the instruction and perform the corresponding operation (e.g., generating a hotkey stroke CTRL-D, and performing KVM redirection to send the hotkey stroke to the host computing device 150). In another embodiment, the voice conversion module 162 may generate the text message, and then generate a corresponding instruction (i.e., an input signal corresponding to the hotkey stroke CTRL-D) based on the text message. In this case, the instruction may be a hotkey input signal or a mouse input signal, which is generally not in the text format.

In certain embodiments, the voice input by the user may not necessarily be human language or human voice. For example, the predefined voice pattern data may define a certain voice pattern to be related to a specific instruction, which can be a host instruction or a control instruction. In this case, when the voice conversion module 162 receives the voice signal from the voice receiving device 128, the voice conversion module 162 may perform voice recognition (which is not text recognition in this case) to the voice signal to obtain a recognition result. If the voice recognition indicates that the voice signal corresponds to the certain voice pattern, the recognition result may be the corresponding instruction to the certain voice pattern.

The host computing device 150 is a computing device which is managed by the controller 110, thus enabling the OOB voice control by the voice input at the mobile device 120 as described above. In certain embodiments, the host computing device 150 may be a general purpose computer or a specific purpose computer. In certain embodiments, when the controller 110 is a BMC, the host computing device 110 may include a baseboard or the "motherboard" (not shown), which is a printed circuit board to which a multitude of components or devices may be connected by way of a system bus or other electrical communication paths, and the BMC 110 may be a component on the baseboard.

The interface 155 is a communication interface between the controller 110 and the host computing device 150. In certain embodiments, the controller 110 may be connected to the host computing device 150 via more than one interface 155. Examples of the interface 155 may include, without being limited thereto, the universal serial bus (USB) interface, standardized IPMI system interfaces such as the keyboard controller style (KCS) interface, the system management interface chip (SMIC) interface, and the block transfer (BT) interface, or any other communication interface.

Figure 2:
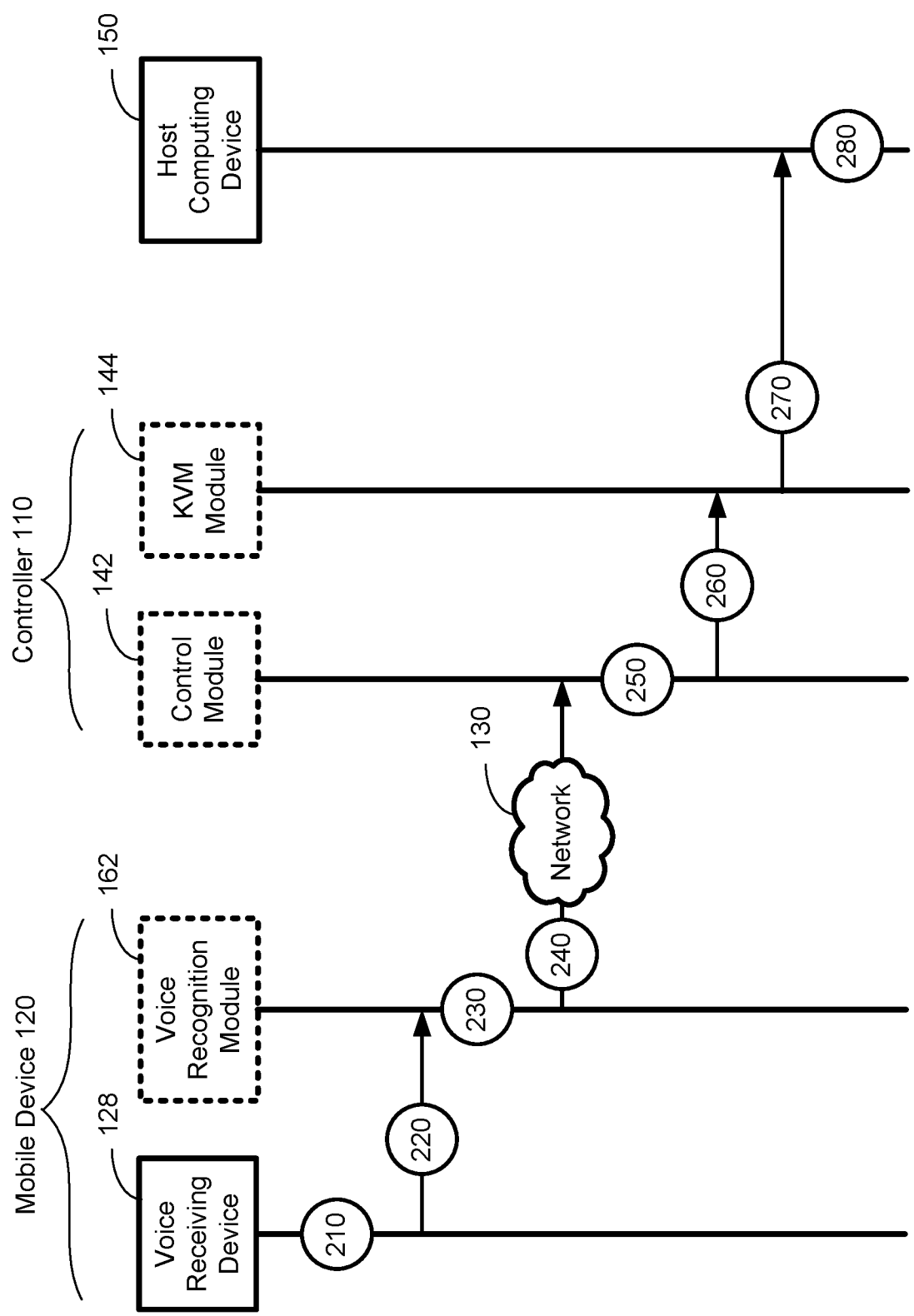
FIG. 2 depicts a process for controlling a controller and its host computing device with voice according to certain embodiments of the present disclosure.

FIG. 2 depicts a process for controlling a controller and its host computing device with voice according to certain embodiments of the present disclosure. In certain embodiments, the method as shown in FIG. 2 may be implemented by a system as shown in FIG. 1 for performing voice control to the controller 110 and the host computing device 150. In certain embodiments, the method may be implemented by the mobile device 120 and the controller 110 of the system 100 as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at the mobile device 120, at procedure 210, the voice receiving device 128 (such as a microphone) of the mobile device 120 may receive a voice input by the user, and generate a corresponding voice signal. At procedure 220, the voice recognition module 162 of the mobile device 120 receives the voice signal from the voice receiving device 128. At procedure 230, the voice recognition module 162 may perform voice recognition to the voice signal, and generate an instruction. In certain embodiments, the instruction may be a controller instruction for the controller 110, or may be a host instruction for the host computing device 150. At procedure 240, the voice recognition module 162 may send the instruction to the controller 110 via the network 130.

At the controller 110, upon receiving the instruction, at procedure 250, the control module 142 may determine the instruction as the controller instruction for the controller 110 or the host instruction for the host computing device 150. If the control module 142 determines the instruction as the controller instruction, the control module 142 may perform a controller operation as the corresponding operation based on the controller instruction. In certain embodiments, the control module 142 may invoke a corresponding module (such as the firmware 140 of the controller 110, or any other corresponding module) to perform the controller operation. On the other hand, if the control module 142 determines the instruction as the host instruction, such as a hotkey input signal or a mouse input signal, at procedure 260, the control module 142 may call the KVM module 144 to perform KVM redirection in order to redirect the host instruction to the host computing device 150. At procedure 270, the KVM module 144 redirects the host instruction to the host computing device 150. Thus, at procedure 280, the host computing device may perform a corresponding operation based on the host instruction (e.g., the hotkey input signal or the mouse input signal). Thus, the controller 110 and the host computing device 150 may be controlled OOB by the voice input at the mobile device 120.

Figure 3:
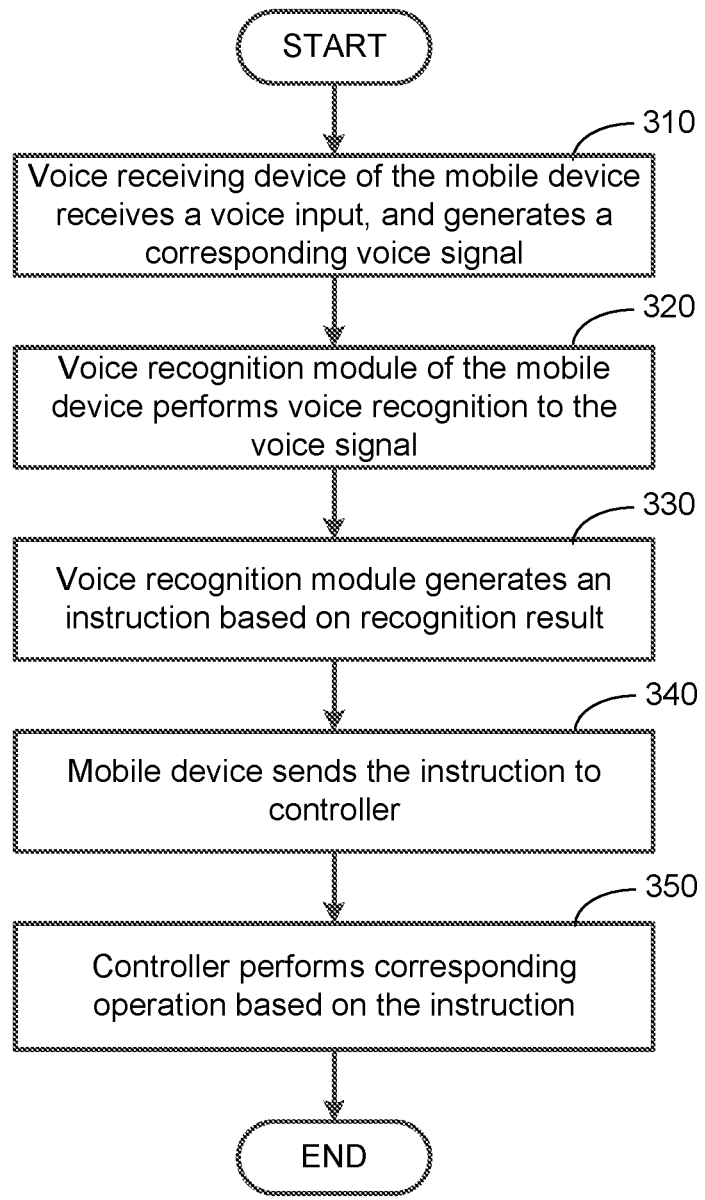
FIG. 3 depicts a flowchart of controlling a controller and its host computing device with voice according to certain embodiments of the present disclosure.

FIG. 3 depicts a flowchart of controlling a controller and its host computing device with voice according to certain embodiments of the present disclosure. In certain embodiments, the method as shown in FIG. 3 may be implemented by a system as shown in FIG. 1 for performing voice control to the controller 110 and the host computing device 150. In certain embodiments, the method may be implemented by the mobile device 120 and the controller 110 of the system 100 as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the voice receiving device 128 of the mobile device 120 may receive a voice input from the user, and generates a corresponding voice signal. At procedure 320, the voice recognition module 162 of the mobile device 120 may perform voice recognition to the voice signal, and obtain a recognition result. At procedure 330, the voice recognition module 162 may generate an instruction based on the recognition result. At procedure 340, the mobile device 120 sends the instruction to the controller 110. At procedure 350, the controller 110 may perform a corresponding operation based on the instruction. In certain embodiments, when the control module 142 of the controller 110 determines the instruction as the controller instruction, the control module 142 may perform a controller operation as the corresponding operation based on the controller instruction. On the other hand, when the control module 142 determines the instruction as the host instruction, such as a hotkey input signal or a mouse input signal, the control module 142 may call the KVM module 144 to perform KVM redirection to redirect the host instruction to the host computing device 150.

As discussed above, the system and method enables a user at the mobile device 120 to remotely control the controller 110 as well as the host computing device 150 by voice. In certain embodiments, the host computing device 150 may employ its own voice input module, which allows a user (which can be the same user at the mobile device 120, or a different user) to control the host computing device 150 in-band by voice. However, the system and method as described above enables simultaneous OOB voice control to the host computing device 150 through the controller 110, thus allowing simultaneous user voice control of the host computing device 150 via both in-band and OOB channels.

In a further aspect, the present disclosure is related to a non-transitory computer readable medium storing computer executable code. The code, when executed at the processors of the controller 110 and the mobile device 120, may perform the method as described above. In certain embodiments, the non-transitory computer readable medium may include, but not limited to, any physical or virtual storage media for the controller 110 and the mobile device. In certain embodiments, the non-transitory computer readable medium may be implemented as the storage device 116 of the controller 110 and the storage device 126 of the mobile device 120 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for controlling a controller with voice, comprising:
    receiving, by a mobile device communicatively connected to the controller via a network, a voice input;
    performing voice recognition, by the mobile device, to the voice input to obtain a recognized voice input;
    generating, by the mobile device, an instruction for the controller or a computing device communicatively connected to the controller based on the recognized voice input, to remotely control the controller or the computing device, wherein the computing device is a host computing device of the controller that enables out-of-band (OOB) voice control by the voice input at the mobile device;
    sending, by the mobile device, the instruction to the controller via the network;
    determining, by the controller, that the instruction is a controller instruction for the controller or a host instruction for the computing device, wherein the host instruction comprises a hotkey input signal or a mouse input signal; and
    performing, by the controller, a corresponding operation based on the instruction, wherein in response to determining the instruction as the host instruction for the computing device and the host instruction comprises the hotkey input signal or the mouse input signal, the corresponding operation comprises performing keyboard-video-mouse (KVM) redirection to redirect the host instruction to the host computing device.

2. The method of claim 1, wherein the controller is a baseboard management controller (BMC).

3. The method of claim 1, wherein in response to determining the instruction as the controller instruction for the controller, the corresponding operation comprises:
    performing a controller operation as the corresponding operation based on the controller instruction.

4. The method of claim 1, wherein the recognized voice input is associated with a text message recognized from the voice input, and the instruction is generated based on the text message.

5. The method of claim 1, wherein the mobile device is configured to perform voice recognition to the voice input by:
- generating, by a voice receiving device, a voice signal based on the voice input; and
- comparing the voice signal with predefined voice pattern data to obtain the recognized voice input.

6. The method of claim 5, wherein the voice receiving device is a microphone.

7. A controller, comprising:
- a processor; and
- a memory storing computer executable code, wherein the computer executable code, when executed at the processor, is configured to:
  - receive an instruction from a mobile device communicatively connected to the controller via a network;
  - determine that the instruction is a controller instruction for the controller or a host instruction for a computing device communicatively connected to the controller, wherein the computing device is a host computing device of the controller that enables out-of-band (OOB) voice control by the voice input at the mobile device, and the host instruction comprises a hotkey input signal or a mouse input signal; and
  - perform, based on the instruction, a corresponding operation to remotely control the controller or the computing device, wherein in response to determining the instruction as the host instruction for the computing device and the host instruction comprises the hotkey input signal or the mouse input signal, the corresponding operation comprises performing keyboard-video-mouse (KVM) redirection to redirect the host instruction to the host computing device;
- wherein the instruction is generated by the mobile device by:
  - receiving a voice input;
  - performing voice recognition, by the mobile device, to the voice input to obtain a recognized voice input; and
  - generating the instruction based on the recognized voice input.

8. The controller of claim 7, being a baseboard management controller (BMC).

9. The controller of claim 7, wherein in response to determining the instruction as the controller instruction for the controller, and the corresponding operation performed by the controller comprises:
- performing a controller operation as the corresponding operation based on the controller instruction.

10. A mobile device capable of controlling a controller and a computing device, comprising:
- a voice receiving device configured to receive a voice input;
- a processor; and
- a memory storing computer executable code, wherein the computer executable code, when executed at the processor of the controller, is configured to:
  - perform voice recognition, by the mobile device, to the voice input received by the voice receiving device to obtain a recognized voice input;
  - generate an instruction for the controller or the computing device based on the recognized voice input, to remotely control the controller or the computing device, wherein the computing device is a host computing device of the controller that enables out-of-band (OOB) voice control by the voice input at the mobile device; and
  - send the instruction to the controller via a network, wherein the controller is configured to:
  - determine that the instruction is a controller instruction for the controller or a host instruction for the computing device, wherein the host instruction comprises a hotkey input signal or a mouse input signal; and
  - perform a corresponding operation based on the instruction, wherein in response to determining the instruction as the host instruction for the computing device and the host instruction comprises the hotkey input signal or the mouse input signal, the corresponding operation comprises performing keyboard-video-mouse (KVM) redirection to redirect the host instruction to the host computing device.

11. The mobile device of claim 10, wherein the voice receiving device is a microphone.

12. The mobile device of claim 10, wherein in response to determining the instruction as the controller instruction for the controller, the corresponding operation performed by the controller comprises:
- performing a controller operation as the corresponding operation based on the controller instruction.

13. The controller of claim 7, wherein the recognized voice input is associated with a text message recognized from the voice input, and the instruction is generated based on the text message.

14. The controller of claim 7, wherein the mobile device is configured to perform voice recognition to the voice input by:
- generating, by a voice receiving device, a voice signal based on the voice input; and
- comparing the voice signal with predefined voice pattern data to obtain the recognized voice input.

15. The controller of claim 14, wherein the voice receiving device is a microphone.

16. The mobile device of claim 10, wherein the controller is a baseboard management controller (BMC).

17. The mobile device of claim 10, wherein the recognized voice input is associated with a text message recognized from the voice input, and the instruction is generated based on the text message.

18. The mobile device of claim 10, wherein the mobile device is configured to perform voice recognition to the voice input by:
- generating, by the voice receiving device, a voice signal based on the voice input; and
- comparing the voice signal with predefined voice pattern data to obtain the recognized voice input.

* * * * *